United States Patent
Hwang et al.

(10) Patent No.: US 11,436,965 B2
(45) Date of Patent: Sep. 6, 2022

(54) DISPLAY DEVICE AND CONTROL METHOD OF SAME

(71) Applicant: SAMSUNG ELECTRONICS CO., LTD., Suwon-si (KR)

(72) Inventors: Sungjun Hwang, Suwon-si (KR); Donghun Shin, Suwon-si (KR); Junyong Park, Suwon-si (KR); Youngah Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/258,012

(22) PCT Filed: Jul. 11, 2019

(86) PCT No.: PCT/KR2019/008580
§ 371 (c)(1),
(2) Date: Jan. 5, 2021

(87) PCT Pub. No.: WO2020/013637
PCT Pub. Date: Jan. 16, 2020

(65) Prior Publication Data
US 2021/0280117 A1   Sep. 9, 2021

(30) Foreign Application Priority Data

Jul. 11, 2018  (KR) ........................ 10-2018-0080573

(51) Int. Cl.
*G09G 3/20*     (2006.01)

(52) U.S. Cl.
CPC ... *G09G 3/2003* (2013.01); *G09G 2320/0666* (2013.01); *G09G 2360/141* (2013.01)

(58) Field of Classification Search
CPC ......... G09G 3/2003; G09G 2320/0666; G09G 2360/141
See application file for complete search history.

(56) References Cited

U.S. PATENT DOCUMENTS

| 6,104,360 A * | 8/2000 | Kim ..................... H04N 17/045 345/11 |
| 7,359,529 B2 * | 4/2008 | Lee ..................... G06K 9/00228 382/103 |

(Continued)

FOREIGN PATENT DOCUMENTS

| KR | 10-2006-0075849 A | 7/2006 |
| KR | 10-0767853 B1 | 10/2007 |

(Continued)

OTHER PUBLICATIONS

International Search Report (PCT/ISA/210) dated Nov. 13, 2019 by the International Searching Authority in counterpart International Patent Application No. PCT/KR2019/008580.

(Continued)

*Primary Examiner* — Ricardo Osorio
(74) *Attorney, Agent, or Firm* — Sughrue Mion, PLLC

(57) ABSTRACT

A display apparatus and a method of controlling the same are provided. The display apparatus includes: a signal receiver configured to receive a video signal of content; a display; and a processor configured to obtain a video photographing a surrounding of the display apparatus, identify a first color representing the obtained video and at least one second color related to the first color, and allocate the identified first color or second color to at least some area of the content or display the allocated first color or second color on the display. Thereby, it is possible to display content in a color fitting a space well.

8 Claims, 13 Drawing Sheets

(56) References Cited

U.S. PATENT DOCUMENTS

| | | | |
|---|---|---|---|
| 8,989,440 B2 | 3/2015 | Klusza et al. | |
| 10,446,114 B2 * | 10/2019 | Whitehead | G09G 3/2003 |
| 2007/0216776 A1 | 9/2007 | Woolfe | |
| 2012/0210229 A1 * | 8/2012 | Bryant | H04N 9/73 |
| | | | 715/723 |
| 2013/0259308 A1 | 10/2013 | Klusza et al. | |
| 2015/0109356 A1 * | 4/2015 | Yata | G09G 3/2003 |
| | | | 345/691 |
| 2015/0110396 A1 * | 4/2015 | Johnson | H04N 1/6077 |
| | | | 382/167 |
| 2015/0237320 A1 * | 8/2015 | Takahashi | H04N 9/67 |
| | | | 348/708 |
| 2015/0281523 A1 * | 10/2015 | Higgins | G09G 5/06 |
| | | | 345/601 |
| 2016/0299683 A1 * | 10/2016 | Kwon | G06F 1/1694 |
| 2017/0103728 A1 | 4/2017 | Chen et al. | |
| 2018/0189983 A1 * | 7/2018 | Lee | G11B 27/28 |

FOREIGN PATENT DOCUMENTS

| | | | |
|---|---|---|---|
| KR | 10-1101127 B1 | | 12/2011 |
| KR | 10-2014-0094161 A | | 7/2014 |
| KR | 10-2016-0044252 A | | 4/2016 |
| KR | 10-1725960 B1 | | 4/2017 |
| KR | 10-2017-0133921 | * | 12/2017 |
| KR | 10-2017-0133921 A | | 12/2017 |
| KR | 10-2018-0040865 | * | 4/2018 |
| KR | 10-2018-0040865 A | | 4/2018 |

OTHER PUBLICATIONS

Written Opinion (PCT/ISA/237) dated Nov. 13, 2019 by the International Searching Authority in counterpart International Patent Application No. PCT/KR2019/008580.

* cited by examiner

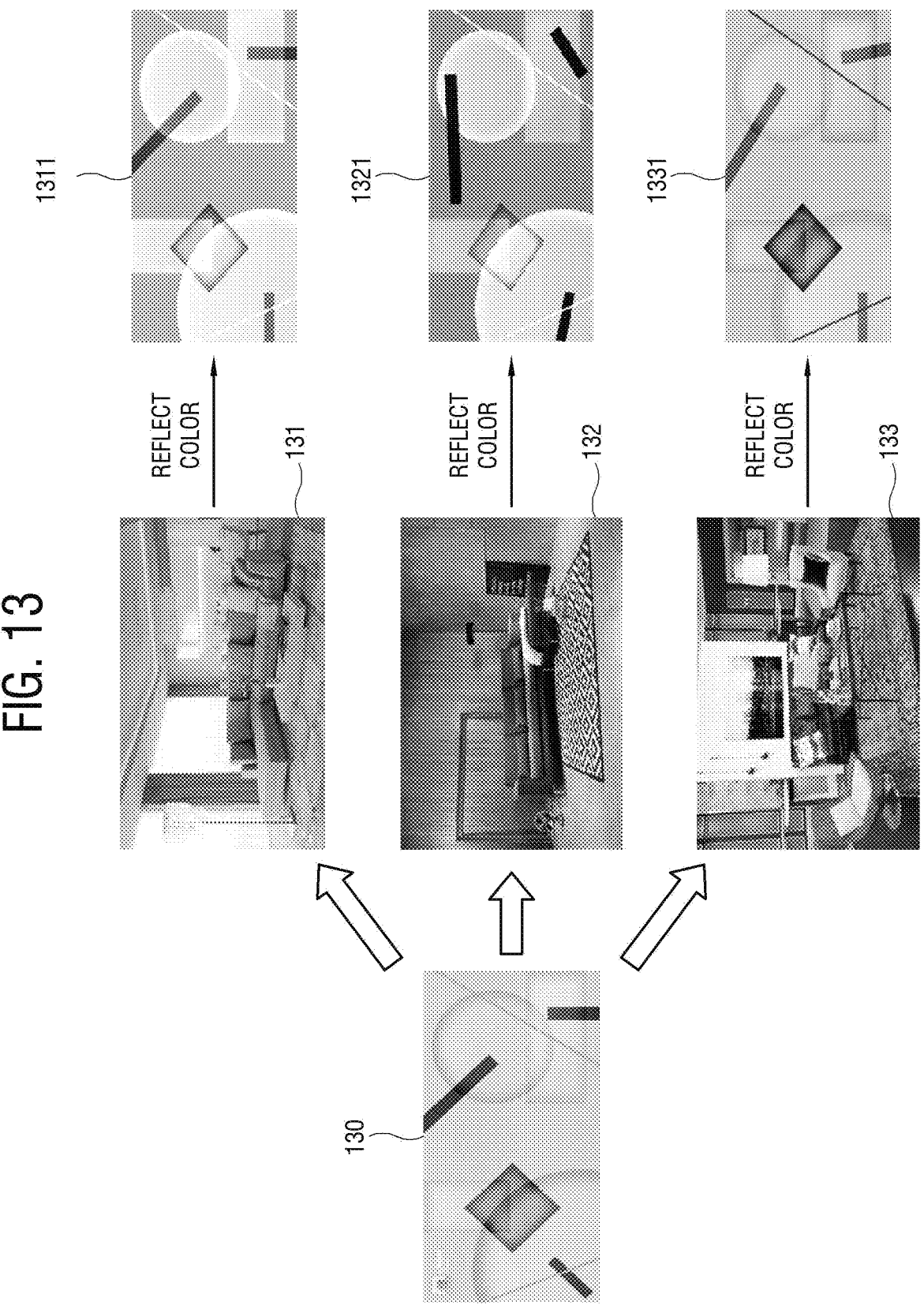

DISPLAY DEVICE AND CONTROL METHOD OF SAME

CROSS-REFERENCE TO RELATED APPLICATIONS

This application is a National Phase Entry of PCT International Application No. PCT/KR2019/008580 filed Jul. 11, 2019, which claims priority to Korean Patent Application No. 10-2018-0080573 filed Jul. 11, 2018.

TECHNICAL FIELD

The disclosure relates to a display apparatus and a method of controlling the same, and more particularly, to a display apparatus for displaying content in good harmony with surrounding spaces, and a method of controlling the same.

BACKGROUND ART

With the recent technological advances in display devices, it is possible to provide an extra-large screen and high-resolution image quality when viewing video.

In addition, attempts have been made to provide a screen that blends with the surrounding background instead of a black and white screen while video is not being viewed.

However, since the content and UI provided to the user are generally produced without considering characteristics of a space around a user, the user may experience a heterogeneous feeling that is not harmonized with the surrounding environment when viewing the content.

In addition, according to the existing technology, various types of recommended content may be displayed on a screen using video information in a space, or the related content may be displayed on the screen using colors extracted from a space in the past.

However, the existing method provides other content suitable for the space, not the user's desired content, and therefore, is difficult to meet the user's demand for the content.

In addition, in order to display content to fit the spaces, a specific algorithm is required to convert a color of original content to fit the space.

DISCLOSURE

Technical Problem

An object of the disclosure provides a display apparatus for displaying content in a color fitting a space, and a method of controlling the same.

Another object of the disclosure provides a display apparatus for more effectively extracting a color fitting a space, and a method of controlling the same.

Still another object of the disclosure provides a display apparatus for effectively reflecting characteristics of content for each area when providing content in a color fitting a space well, and a method of controlling the same.

Technical Solution

According to an aspect of the disclosure, a display apparatus includes: a signal receiver configured to receive a video signal of content; a display; and a processor configured to obtain a video photographing a surrounding of the display apparatus, identify a first color representing the obtained video and at least one second color related to the first color, and allocate the identified first color or second color to at least some area of the content or display the allocated first color or second color on the display.

The processor may be configured to identify the first color based on a color share of the obtained video or a priority of identified objects.

The processor may be configured to identify the at least one second color by using a plurality of pieces of color combination information.

The processor may be configured to allocate the identified first color or second color to at least some area of the content based on information on a preset color tone and characteristics for each area of the content video.

The processor may be configured to convert RGB values of each of the identified first color and second color into HSV values, and change a color of at least some area of the content using each of the converted HSV values.

The processor may be configured to arrange each of the converted HSV values in order of high brightness, and change the color of at least some area of the content based on the arranged order.

The display apparatus may further include a camera configured to obtain the video, and the processor may be configured to change the first color and the second color by using the video obtained from the camera at a predetermined period.

The processor may be configured to generate an image of a predetermined pattern using the identified first color and second color, and display the generated image on the display.

The display apparatus may further include an input interface configured to receive a user input, and the processor may be configured to set the information on the color tone and the characteristics for each area of the content video according to the received user input.

According to an aspect of the disclosure, a method of controlling a display apparatus includes: receiving a video signal of content; obtaining a video photographing a surrounding of the display apparatus; identifying a first color representing the obtained video and at least one second color related to the first color; and allocating the identified first color or second color to at least some area of the content or displaying the allocated first color or second color.

The method further include identifying the first color based on a color share of the obtained video or a priority of identified objects.

The method may further include identifying the at least one second color by using a plurality of pieces of color combination information.

The method may further include allocating the identified first color or second color to at least some area of the content based on the information on a preset color tone and characteristics for each area of the content video.

The method may further include converting RGB values of each of the identified first color and second color into HSV values; and changing a color of at least some area of the content using each of the converted HSV values.

The method may further include arranging each of the converted HSV values in order of high brightness, and changing the color of at least some area of the content based on the arranged order.

The method may further include changing the first color and the second color by using the video obtained from the camera included in the display apparatus at a predetermined period.

The method may further include generating an image of a predetermined pattern by using the identified first color and second color; and displaying the generated image.

The method may further include receiving a user input; and setting information on the color tone and the characteristics for each area of the content video according to the received user input.

According to still another aspect of the disclosure, a computer program product includes: a memory in which a plurality of instructions are stored; and a processor, in which when the instruction is executed by the processor, the instruction includes obtaining a video photographing a surrounding of the display apparatus, identifying a first color representing the obtained video and at least one second color related to the first color, and allocating the identified first color or second color to at least some area of the content and displaying the allocated first color or second color on the display.

The instruction may include identifying the first color based on a color share of the obtained video or a priority of identified objects.

Advantageous Effects

As described above, according to the disclosure, it is possible to provide a user with a consumption experience of content having a sense of unity with his or her own space by displaying the content in the color fitting the space well.

In addition, according to the disclosure, it is possible to provide an effective algorithm for extracting the color fitting the space well.

In addition, according to the disclosure, it is possible to effectively reflect the characteristics for each area of the content when providing content in the color fitting the space well.

DESCRIPTION OF DRAWINGS

FIG. 13 is a diagram illustrating an example of a color change of content video based on a space according to an embodiment of the disclosure.

MODE FOR DISCLOSURE

Figure 1:
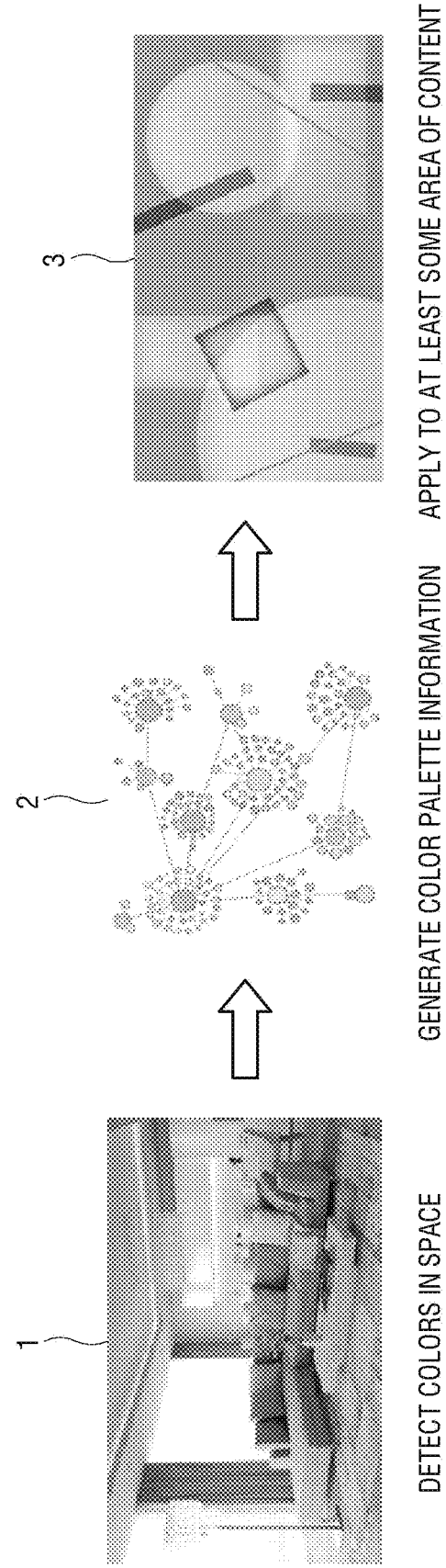
FIG. 1 is a diagram illustrating a basic concept of reflecting a color fitting a space to content according to an embodiment of the disclosure.

Hereinafter, embodiments of the disclosure will be described in detail with reference to the accompanying drawings so that those of ordinary skill in the technical field to which the disclosure belongs can easily implement these embodiments. In the drawings, the same reference numbers or signs refer to components that perform substantially the same function, and the size of each component in the drawings may be exaggerated for clarity and convenience. However, the technical idea and the core configuration and operation of the disclosure are not limited only to the configuration or operation described in the following examples. In describing the disclosure, if it is determined that a detailed description of the known technology or configuration related to the disclosure may unnecessarily obscure the subject matter of the disclosure, the detailed description thereof will be omitted.

In embodiments of the disclosure, at least one of the plurality of elements refers to not only all of the plurality of elements, but also each one or all combinations thereof excluding the rest of the plurality of elements.

FIG. 1 is a diagram illustrating a basic concept of reflecting a color fitting a space to content according to an embodiment of the disclosure. As illustrated in FIG. 1, a display apparatus 10 according to the disclosure acquires captured video 1 photographing the surrounding space, and detects a color in a space from the acquired captured video 1 to generate color palette information 2 that fits the space well.

In this process, the display apparatus 10 determines at least one first color representing the space and at least one second color related to the first color from the captured video 1, and determines the color palette information 2 including both the first color and the second color.

The display apparatus 10 changes and displays a color of content video 3 using the color palette information 2 generated as described above. Here, the content video 3 may include not only general content received from the outside such as broadcast video, but also a graphic user interface (GUI) provided when the display apparatus 10 performs at least one function.

Figure 2:
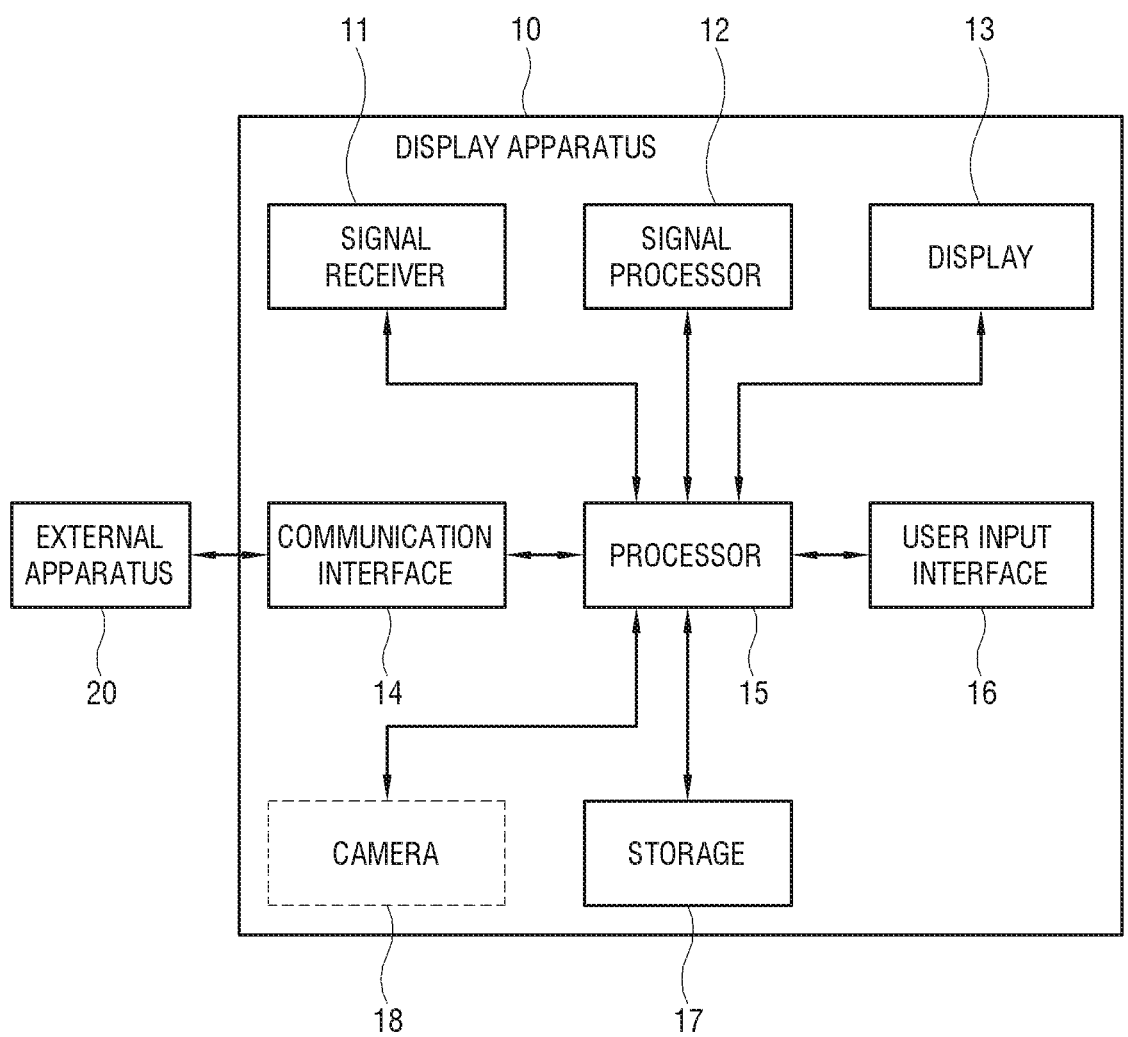
FIG. 2 is a block diagram illustrating a configuration of a display apparatus according to an embodiment of the disclosure.

FIG. 2 is a block diagram illustrating a configuration of a display apparatus according to an embodiment of the disclosure. As illustrated in FIG. 2, the display apparatus 10 according to the disclosure includes a configuration of a signal receiver 11, a signal processor 12, a display 13, a communication interface 14, a processor 15, and a user input interface 16, and a storage 17, and may further include a camera 18. The display apparatus 10 may be implemented as, for example, a TV, a PC, a notebook computer, and the like, or may be implemented as a large format display (LFD) such as a large electronic signboard.

The display apparatus 10 may communicate with an external apparatus 20 through the communication interface 14. Here, the external apparatus 20 may be implemented as, for example, a mobile device, a tablet, or the like. The configuration included in the display apparatus 10 is not limited to the embodiment of the disclosure, and may be implemented by excluding or changing some configurations or including additional other configurations.

The signal receiver 11 receives a video signal of content from the outside, and the video signal may include, for example, a video or graphic signal. The signal receiver 11 may be provided in various formats according to the standard of a broadcast signal and a video signal to be received and an implementation form of the display apparatus 10. For example, the signal receiver 11 may be implemented as a tuner that receives a radio frequency (RF) broadcast signal or a satellite signal transmitted from a broadcasting station.

The signal processor 12 performs a preset signal processing process on the video signal or the broadcast signal that is received by the signal receiver 11. Examples of signal processing performed by the signal processor 12 may include, but not limited to, demultiplexing, decoding, de-interlacing, scaling, noise reduction, detail enhancements, and the like. The signal processor 12 may be implemented as a system-on-chip (SOC) in which these functions are integrated or a video processing board on which individual components capable of independently performing each process are mounted.

The display 13 displays video based on the video signal processed by the signal processor 12. The implementation mode of the display 13 is not limited, and therefore, the display 13 can be implemented in various forms, such as a plasma display panel (PDP), a liquid crystal display (LCD), organic light emitting diodes (OLED), and a flexible display.

The communication interface 14 communicates with the external apparatus 20 in a wired or wireless communication manner. The communication interface 14 may communicate with the display apparatus 10 through short-range wireless communication manners such as Wi-fi direct, Bluetooth, and Zigbee. The communication interface 14 may be connected to the display apparatus 10 by performing pairing with the display apparatus 10 when communicating with the display apparatus 10 through a Bluetooth manner.

The camera 18 acquires captured video photographing the front. For example, the camera 18 includes image sensors such as a complementary metal oxide semiconductor (CMOS) or a charge coupled device (CCD). The camera 18 may be built into the display apparatus 10 or mounted on the outside thereof, and for example, may be installed in a form mounted on a front upper side of the display 13.

The user input interface 16 receives a user input for controlling at least one function of the display apparatus 10. For example, the user input interface 16 may receive a user input for selecting a part of a user interface displayed on the display 13. The user input interface 16 may be implemented in the form of an input panel provided outside the display apparatus 10 or a touch screen provided in the display apparatus 10. In addition, the user input interface 16 may be implemented as a keyboard, a mouse, or the like that is connected to the display apparatus 10 or as a remote controller that communicates with the display apparatus 10 in an infrared manner.

As an embodiment, the user input interface 16 may receive a user input from a mobile device that communicates with the display apparatus 10 through Wi-Fi, Bluetooth, or infrared communication schemes. In this case, the mobile device may be provided as a smart phone, and the like, and transmit a user input to the display apparatus 10 by touching a button to control the operation of the display apparatus 10 by installing, for example, a remote control application and executing the remote control application.

The storage 17 includes a first memory (not illustrated) and a second memory (not illustrated), and the first memory is implemented as a nonvolatile memory such as a flash-memory to store data regardless of whether power is supplied to a system of the display apparatus 10.

The first memory stores a plurality of instructions for executing at least one application. The first memory performs read, write, edit, delete, update, and the like on each of a plurality of stored instructions.

The second memory is a high-speed buffer memory provided between the first memory and the processor 15, and includes a cache memory or a local memory. The second memory is faster than the flash memory and can be directly accessed by the processor 15. The second memory, which is an area in which data or program commands frequently accessed by the processor 15 are stored to be immediately used without repetitive search, may be implemented as a RAM, for example. As an embodiment, the second memory may be integrally provided, for example, inside the processor 15.

The processor 15 performs a control process for controlling a plurality of functions that the display apparatus 10 can perform. The processor 15 may be implemented as a central processor (CPU), and includes three areas of control, operation, and register. The control area interprets program commands, and instructs the operation of each component of the electronic device 10 according to the meaning of the interpreted commands. An operation area performs arithmetic and logical operations. In accordance with the instruction of the control area, operations necessary for each component of the electronic device 10 to operate are performed. The register is a storage location for storing necessary information while executing an instruction in the CPU, stores instructions and data for each configuration of the electronic device 10, and stores the calculated result.

The processor 15 may execute at least one program and, for example, may execute an operating system of the display apparatus 10.

Figure 3:
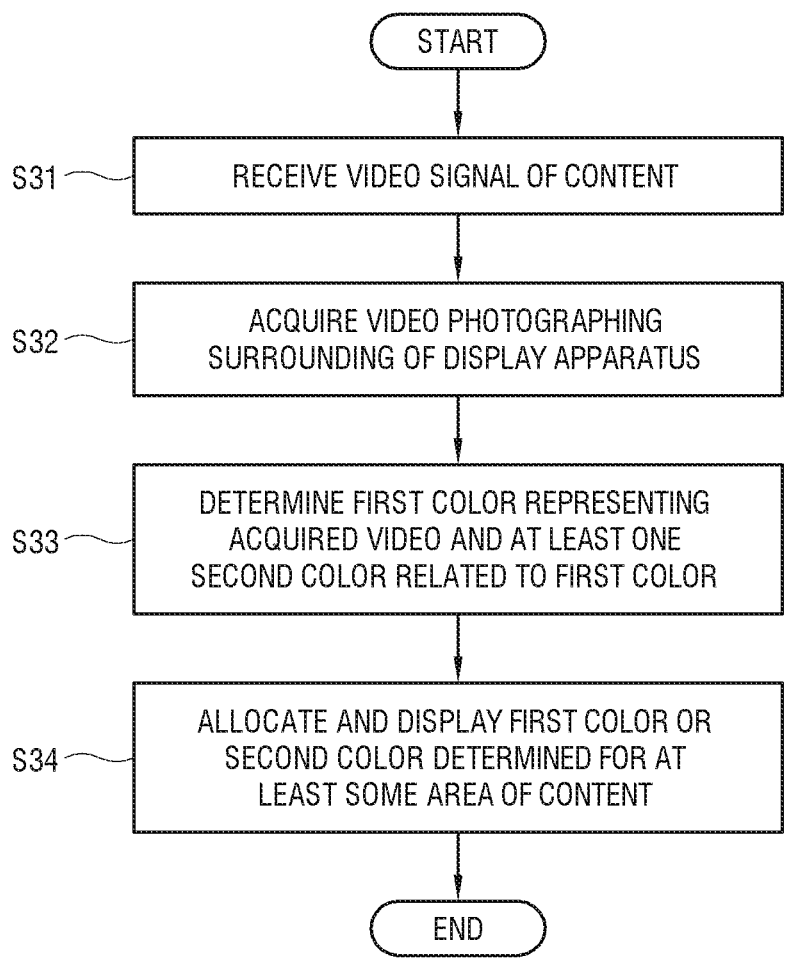
FIG. 3 is a flowchart illustrating a method of controlling a display apparatus according to an embodiment of the disclosure.

In the embodiment of the disclosure, the operation of the processor 15 may be illustrated as a flowchart of FIG. 3. First, in operation S31, the processor 15 receives a video signal of content.

In operation S32, the processor 15 acquires the captured video 1 photographing the surroundings of the display apparatus 10. At this time, the captured video 1 may be received from the external apparatus 20 such as a mobile device through the communication interface 14, or may be acquired from the camera 18 built into the display apparatus 10.

Next, in operation S33, the processor 15 determines a first color (refer to reference numeral '43' in FIG. 4) representing the acquired captured video 1 and at least one color associated with the first color 43. Here, the first color 43 includes at least one color detected in the space in the captured video 1. For example, the first color 43 may include colors such as floor, ceiling, wallpaper, and furniture in the captured video 1. Accordingly, when the display apparatus 10 itself includes a camera, it is possible to acquire video by periodically photographing surrounding spaces, and change colors fitting spaces in real time from the acquired video.

The second color includes at least one color that is similar to the first color 43 or is well harmonized with the first color 43, such as a color having a complementary color relationship.

Finally, in operation S34, the processor 15 allocates the first color 43 or the second color to at least some area of the content video 3 and displays the allocated first code 43 or second color. Here, the first color 43 and the second color may be generated as color palette information (reference numeral '44' in FIG. 4). That is, the processor 15 may allocate colors included in the color palette information 2 to at least some area of the content video and display the allocated colors.

In one embodiment, the processor 15 may generate an image having a predetermined pattern by using color palette information including the first color 43 and at least one second color determined using the captured video 1 photographing the surroundings. In this case, the processor 15 may display an image having a predetermined pattern that is well harmonized with the surrounding space instead of the content video 3. Accordingly, even when the content is not displayed, it is possible to provide an image of a predetermined pattern to which a color fitting a space well is reflected.

As described above, according to the disclosure, it is possible to provide a user with a consumption experience of content having a sense of unity with his or her own space by displaying the content in the color fitting the space well. In addition, it is possible to effectively reflect the characteristics for each area of the content when providing content in the color fitting the space well.

On the other hand, the display apparatus 10 of the disclosure may download and execute instructions stored in a separate computer program product (not illustrated) to perform an operation of displaying content video in a color fitting a space by using video photographing the surroundings.

As an example, the display apparatus 10 may download and install a predetermined application providing the function of the disclosure from an external server, and execute the installed application to perform an operation of displaying the content video 3 in a color fitting a space by using the video 1 photographing the surroundings.

In one embodiment, the computer program product includes a memory in which a plurality of instructions are stored and a processor. Here, when executed by the processor, the instruction includes acquiring the video 1 photographing the surroundings of the display apparatus 10, determining the first color 43 representing the acquired video 1 and at least one second color related to the first color 43, and allocating the determined first color or second color 44 to at least some area of the content 3 and displaying the allocated first color or second color 44 on the display 13.

As an embodiment, the instruction may include determining the first color 43 based on a color share of the acquired video 1 or a priority of identified objects. Accordingly, a color having a high space share or a color of a major object in the video photographing the space may be used as a representative color and reflected to the content.

Figure 4:
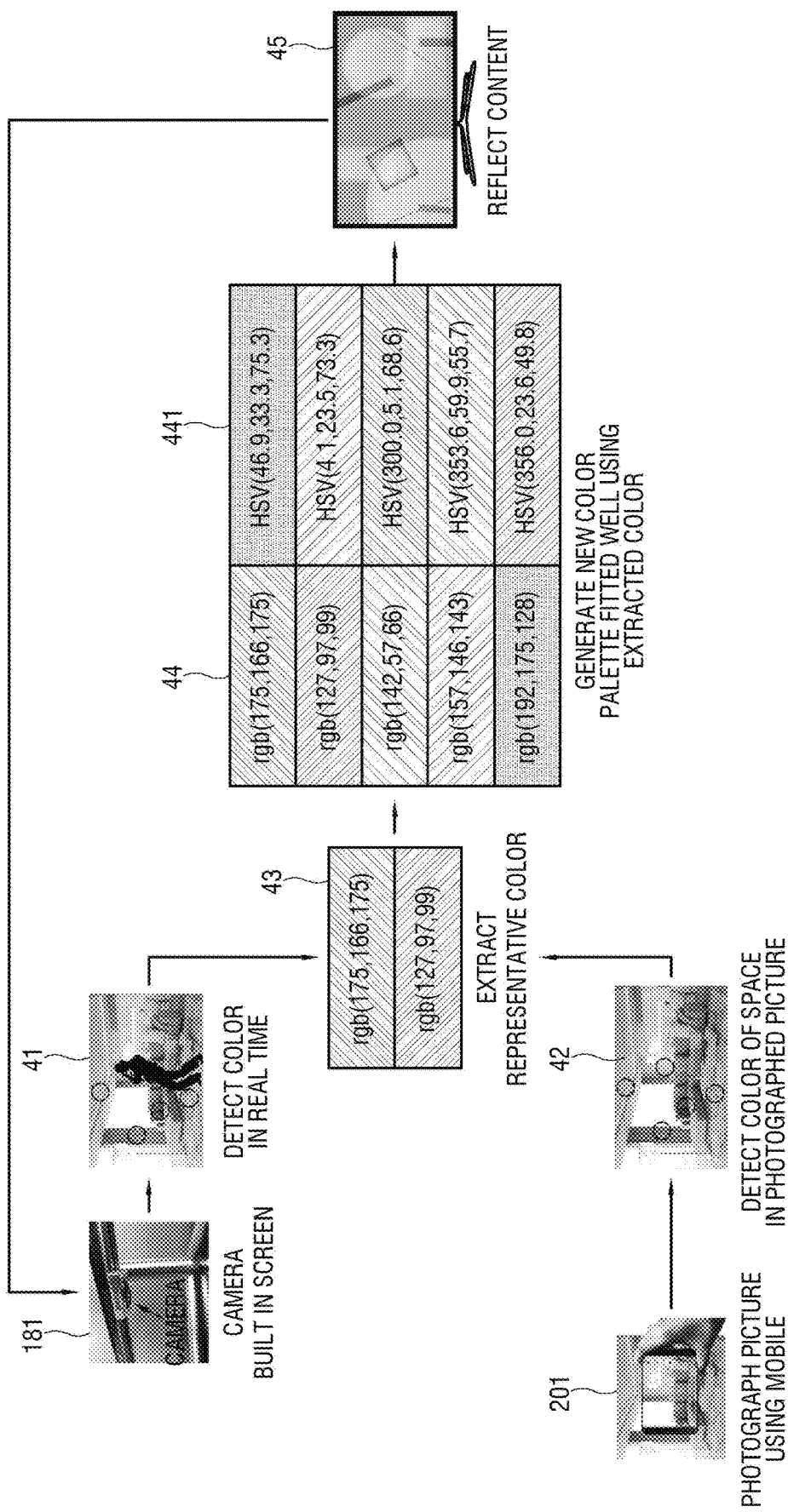
FIG. 4 is a diagram illustrating a specific example of reflecting the color fitting the space to the content according to the embodiment of the disclosure.

FIG. 4 is a diagram illustrating a specific example of reflecting the color fitting the space to the content according to the embodiment of the disclosure. An example is illustrated in which in operations S31 to S34 of FIG. 3, a specific method of applying a color fitting a space well to content video by using video photographing a surrounding space.

As an embodiment, the processor 15 acquires captured videos 41 and 42 photographing the surrounding space from a camera 181 built in a screen of a display 130 or a mobile device 201.

The processor 15 detects colors in space from the acquired captured videos 41 and 42, and extracts at least one first color 43 as a representative color representing the space from the detected colors. For example, the at least one first color 43 may include colors corresponding to RGB 175, 166, and 175 and RGB 127, 97, and 99, respectively.

The processor 15 generates color palette information 44 including the first color 43 extracted from the captured videos 41 and 42 and colors fitting the first color 43 well. As an example, the color palette information 44 may include the first color 43, and colors corresponding to RGB 142, 57, and 66, RGB 187, 146, and 143, and RGB 192, 178, and 128 that are analyzed as fitting the first color 43 well.

In order to reflect the color palette information 44 to the content video 45, the processor 15 changes RGB values of each color included in the color palette information 44 to a HSV value 441 that is converted into a color space including hue, saturation, and brightness (value). Accordingly, in order to reflect the color fitting the space well to the content, the RGB values of each color may be converted into the HSV values. In this case, the processor 15 may arrange each color converted into the HSV values 441 in order of high brightness. Accordingly, the HSV values of each color may be arranged in order of brightness to easily reflect the colors in consideration of the characteristics for each area of the content.

The processor 15 changes the color of at least some area of the content video 45 based on the changed HSV value 441 of each color in the color palette information 44 as described above.

Figure 5:
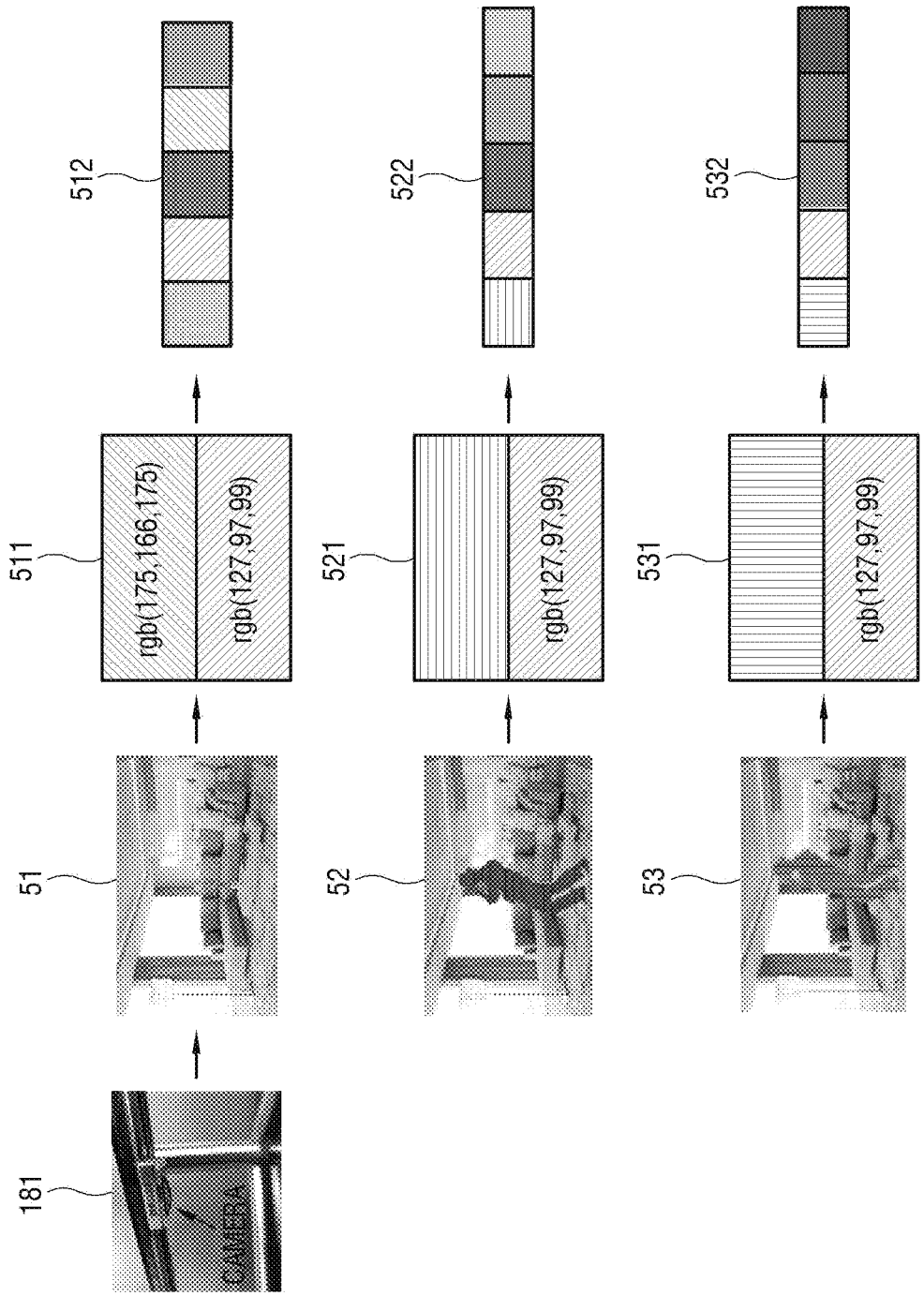
FIG. 5 is an example of changing a color palette to be reflected to the content by periodically photographing a space according to an embodiment of the disclosure.

FIG. 5 is an example of changing a color palette to be reflected to the content by periodically photographing a space according to the embodiment of the disclosure. An example is illustrated in which in operations S32 and S33 of FIG. 3, an operation of acquiring video photographing a surrounding space and an operation of determining a first color and at least one second color from the acquired video are repeatedly performed.

As an embodiment, the processor 15 acquires captured videos 51, 52, and 53 photographing surrounding spaces from the camera 181 built in the screen of the display 13 at a predetermined period. At this time, the first captured video 51 photographed at a first point in time shows objects such as floor, wallpaper, ceiling, sofa, and curtain, and the second captured video 52 photographed at a second point in time that elapses a predetermined time from the first point in time further shows a person in addition to the objects in the first capture video 51.

Similarly, the third capture video 53 is photographed at a third point in time that elapses a predetermined time from the second point in time at which the second capture video 52 is photographed, and shows a state in which a color of a person's clothes in the second capture video 52 is changed.

As described above, the processor 15 acquires the plurality of captured videos 51, 52, and 53 at a predetermined period, and extracts first colors 511, 521, and 531 that represent a space from each of the captured videos 51, 52, and 53.

As an example, the processor 15 extracts the color of the sofa and the curtain as the first color 511 representing the space from the captured video 51 photographed at the first point in time, and extracts the color of the curtain and the person's clothes as the first color 521 representing the space from the captured video 52 photographed at the second point in time. The processor 15 also extracts the color of the curtain and the person's clothes as the first color 531 representing the space from the captured video 53 photographed at the third point in time.

As described above, when the first colors 511, 521, and 531 representing the space are extracted from each of the captured videos 51, 52, and 53 photographed at a predetermined period, the processor 15 generates each color palette information 512, 522, and 532 corresponding to each photographing point in time, including colors fitting each first color 511, 521, and 531 well.

That is, the processor 15 may change the content video to the color fitting the space at each point in time by using the color palette information 512, 522, and 532 varying according to the shape of the space at the photographing point in time.

According to the embodiment of the disclosure as described above, the built-in camera may continuously monitor the space to reflect an instantaneous color change, which is caused by a person's movement in the space, to the content.

Figure 6:
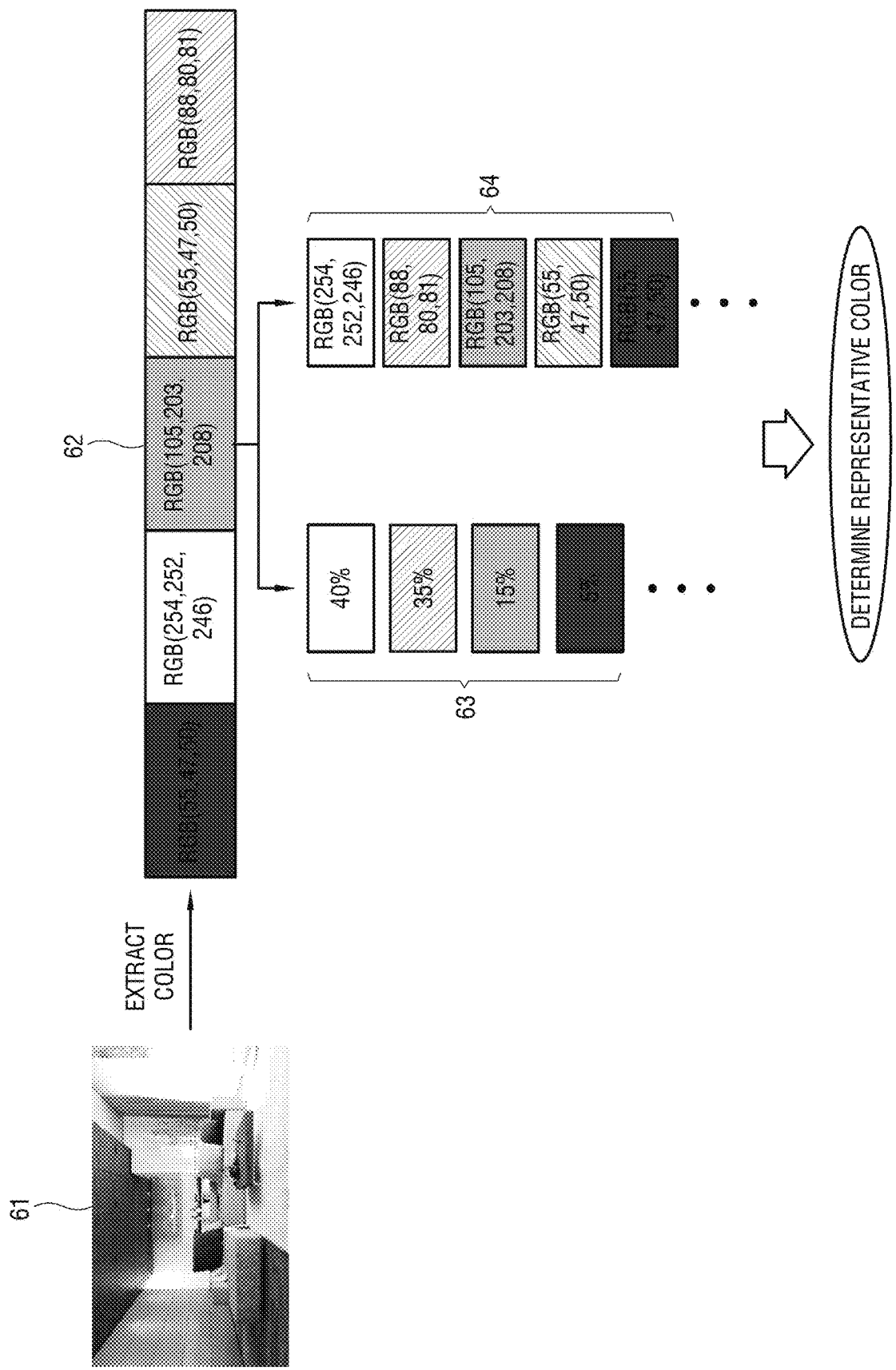
FIG. 6 is an example of determining a representative color based on a color share in a space and a priority of objects according to an embodiment of the disclosure.

FIG. 6 is an example of determining a representative color based on a color share in a space and a priority of objects according to an embodiment of the disclosure. An example illustrates a specific method of determining a first color representing an acquired video, that is, a representative color in operation S33 of FIG. 3.

In one embodiment, the processor 15 extracts a plurality of colors 62 identified in the space in the captured video 61.

The processor 15 may use the following two criteria to determine a representative color representing a space among the plurality of colors 62 extracted from the captured video 61.

As an embodiment, the processor 15 may determine the representative color based on a share 63 of the color in the space. For example, the processor 15 may select, as the representative color of the space, two colors having a high color share (63) of 40% and 35% among the plurality of colors 62 extracted from the captured video 61.

As another embodiment, the processor 15 may recognize at least one object, that is, an object from the captured video 61, and may determine a representative color based on a priority 64 of the recognized objects. For example, the processor 15 may select, as a representative color of a space, a wall, a loop, and a floor with the high priority 64 among the plurality of colors 62 extracted from the captured video 61. In this case, the priority 64 of the object in the space of the captured video 61 may be preset and stored, or may be set through the user input.

Figure 7:
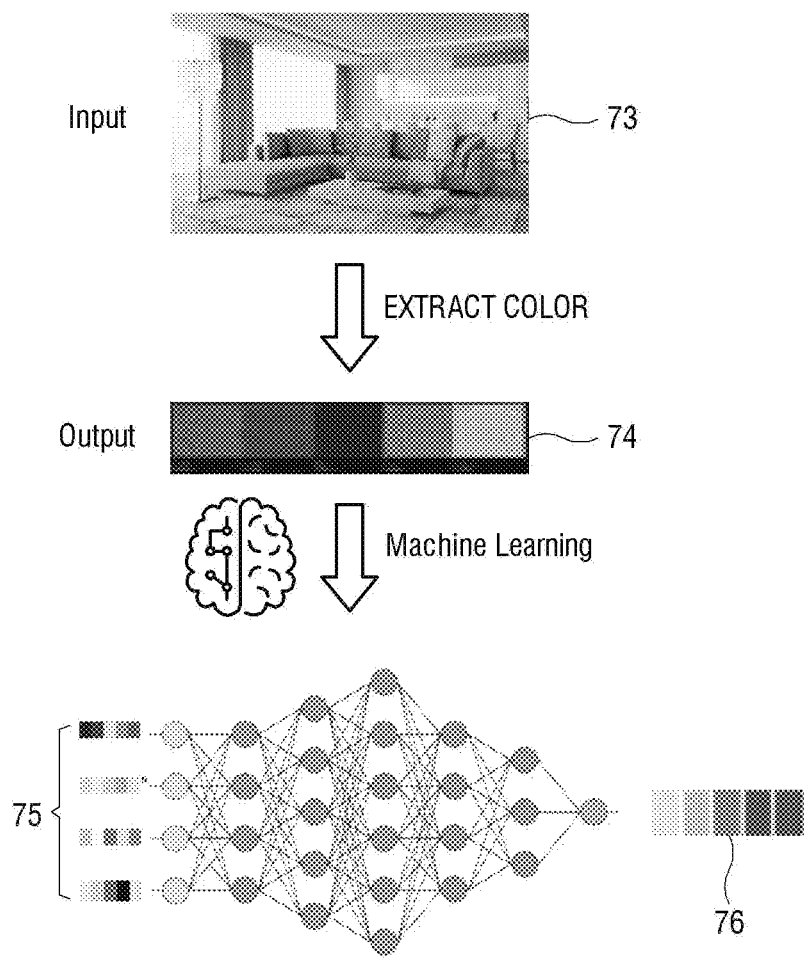
FIG. 7 is a diagram illustrating an example of determining a color palette through machine learning using a color combination sample according to an embodiment of the disclosure.

FIG. 7 illustrates an example of determining a color palette through machine learning using a color combination sample according to an embodiment of the disclosure. An example illustrates a specific method of determining a first color representing acquired video, that is, a representative color, and then determining at least one second color related to the first color in operation S33 of FIG. 3.

In one embodiment, the processor 15 extracts a plurality of colors 74 identified in the space in the captured video 73. In the illustrated example, a plurality of colors 74 are all used as a representative color representing the capture video 73.

The processor 15 uses a plurality of color combination samples 75 to generate color palette information 76 that fits the plurality of colors 74 extracted from the captured video 73 well.

For example, the processor 15 may implement a color palette engine 77 using the color combination sample 75 of a color specialized company, an interior specialized company, and the like. When a combination of specific colors, such as a plurality of colors 74, is input, the color palette engine may output the color palette information 76 that fits the plurality of colors well through the machine learning using the color combination sample 75. Accordingly, it is possible to obtain colors fitting a color representing a space by using various color combination samples acquired from the outside.

Figure 8:
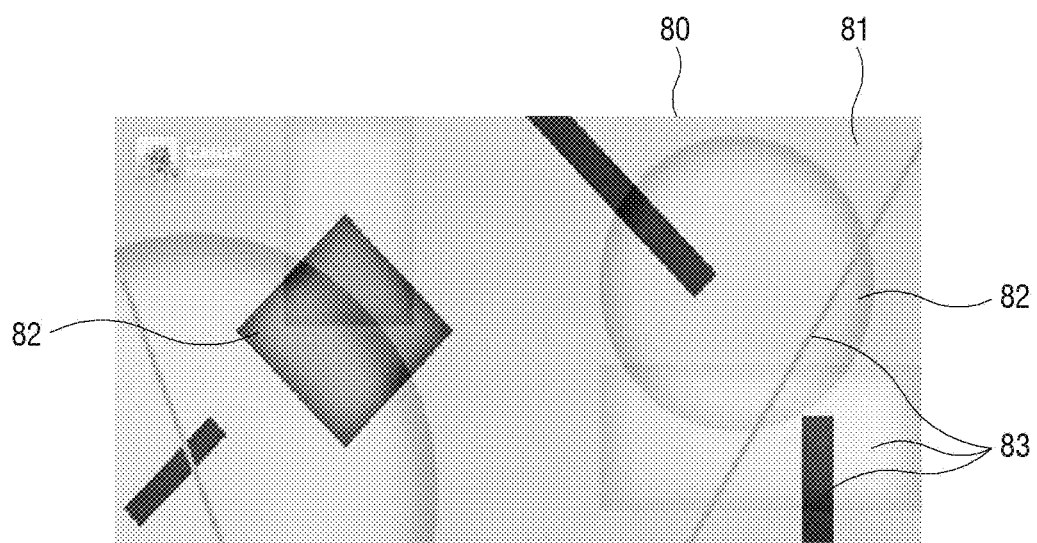
FIG. 8 is an example of reflecting the color palette to the content in consideration of characteristics for each area of content according to an embodiment of the disclosure.
Figure 9:
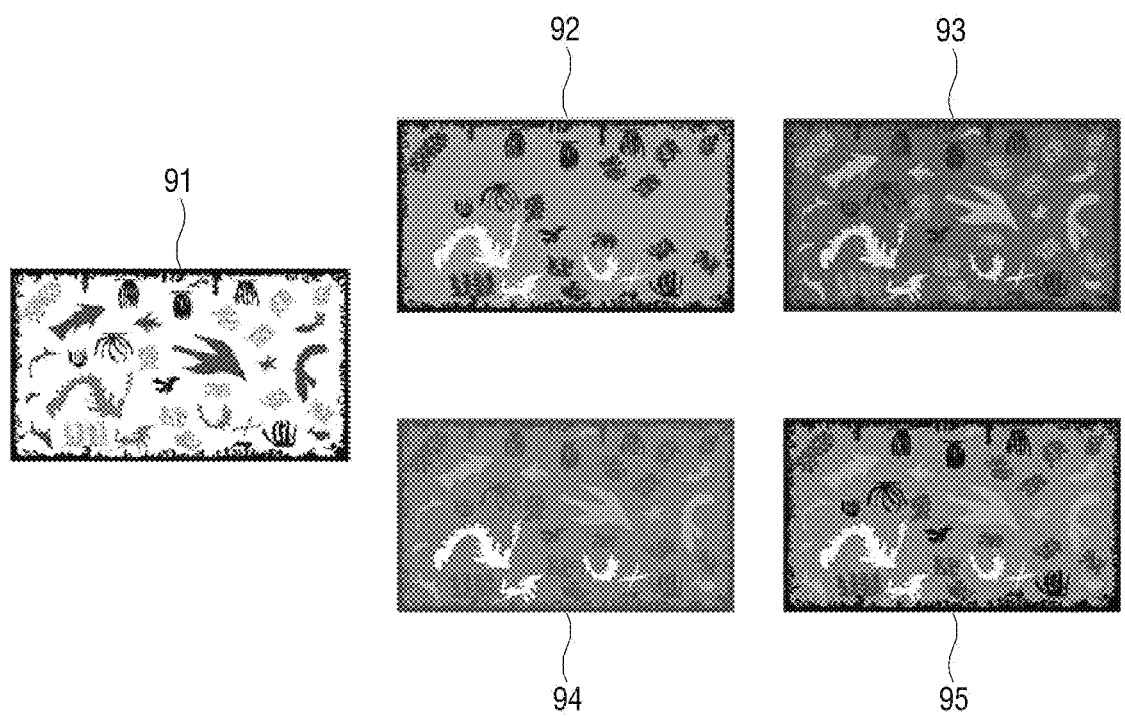
FIG. 9 is an example of reflecting a color palette to content in consideration of the characteristics for each area of the content according to the embodiment of the disclosure.

FIGS. 8 and 9 are examples of reflecting a color palette to content in consideration of the characteristics for each area of content according to an embodiment of the disclosure. An example illustrates a specific method of allocating and displaying the determined first color or second color to at least some area of content in operation S34 of FIG. 3.

As an embodiment, in FIG. 4, the processor 15 may reflect, to at least some area of the content video 80, the color palette information 44 generated including the first color 43 extracted as a color representing a space from the captured videos 41 and 42 and at least one second color fitting the first color 43 well.

As an embodiment, the content video 80 is implemented in a software form, and a color principle for applying a color to the content video 80 may be set.

The color principle applied to the content video 80 may include, for example, a color tone and color characteristics for each area or each configuration of content. At this time, the color tone affects the color change of the color palette information 44, and as an example, pastel tone, a vivid tone, a light tone, and a cool tone may be applied separately.

In addition, the color characteristics for each area or each configuration of the content are related to at least some area of the content video 80 or what color of the characteristics to be applied to each configuration identified in the content video 80, and as an example, a base color, a dominant color, an accent color, and the like may be applied separately.

As an embodiment, the base color is defined as a color that is the background of the content video 80, and may be set to apply a color having the second highest brightness (value) among the colors of the color palette information 44.

The dominant color is defined as a color that serves as an auxiliary role of the base color, and may be set to select and apply a color having a complementary relationship with the base color.

In addition, the accent color is defined as a color that occupies the smallest area in the content video 80, but is a point, and may be set to apply a color having high brightness (value) among the colors of the color palette information 44.

In the example of FIG. 8, the processor 15 may apply the base color among the color palette information 44 to a background area 81 of the content video 80, apply the accent color to main figures 82 such as a circle and a diamond, and apply the dominant color to sub figures 83 such as a line and a rectangle, according to color characteristics for each area or each configuration predefined in the content video 80.

In addition, in the example of FIG. 9, even if the content is the same, when color characteristics for each configuration are differently set in each of the content videos 91, 92, 93, 92, and 95, the processor 15 may apply different colors to each configuration in the content videos 91, 92, 93, 92, and 95. That is, each of the content videos 91, 92, 93, 92, and 95 applies different colors to the background and objects according to the set color characteristics.

Figure 10:
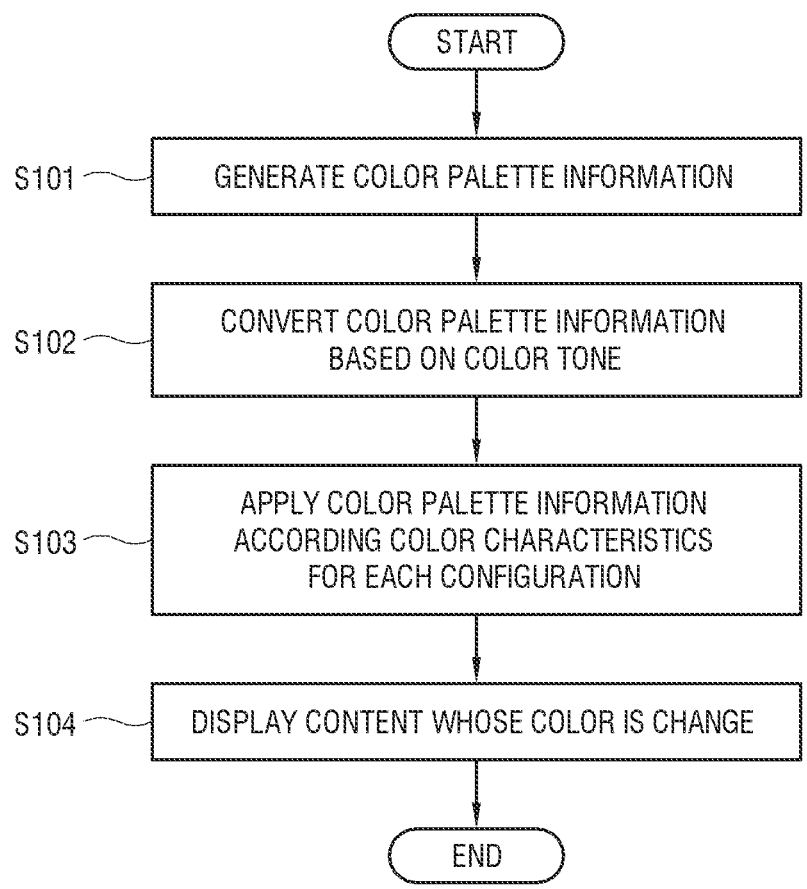
FIG. 10 is a flowchart illustrating a method of reflecting a color palette to content in consideration of a color tone of content and characteristics for each area according to an embodiment of the disclosure.

FIG. 10 is a flowchart illustrating a method of reflecting a color palette to content in consideration of a color tone and characteristics for each area of the content according to the embodiment of the disclosure. The illustrated example is a flowchart showing in more detail an operation of allocating and displaying a first color or a second color determined for at least some area of content in operations S33 and S34 of FIG. 3.

First, in operation S1, the processor 15 generates the color palette information (refer to reference numeral '111' in FIG. 11) including the first color and at least one second color determined by performing the operation S33 of FIG. 3 from the video photographing the surroundings.

Figure 11:
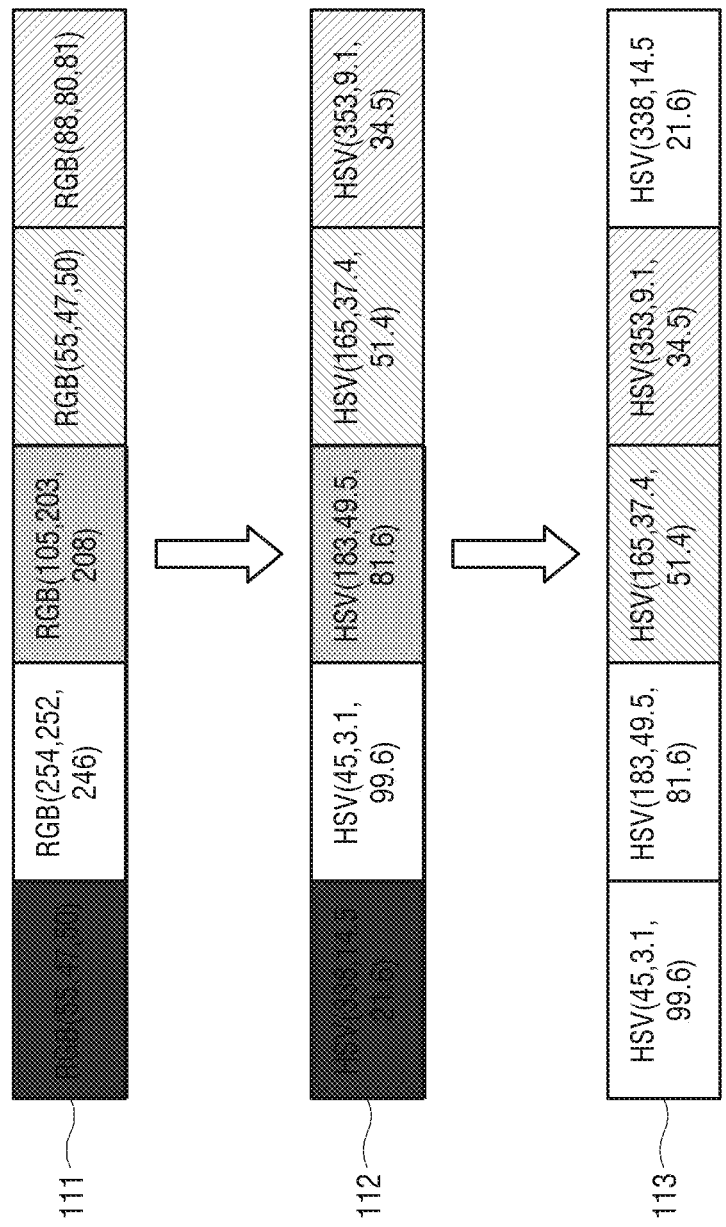
FIG. 11 is an example of color space conversion and arrangement in order of brightness of a color palette according to an embodiment of the disclosure.

As an embodiment, as in the example of FIG. 11, the processor 15 may convert the RGB value of each color included in the color palette information 111 into the HSV value 112 representing the color space of hue, saturation, and brightness.

In addition, the processor 15 may generate color palette information 113 in which the HSV values of the color palette information 112 are arranged in the order of high brightness, so that the content video 45 can be applied to each area or each configuration.

Next, in operation S102, the processor 15 converts the color palette information 113 based on the color tone preset in the content video 45.

Figure 12:
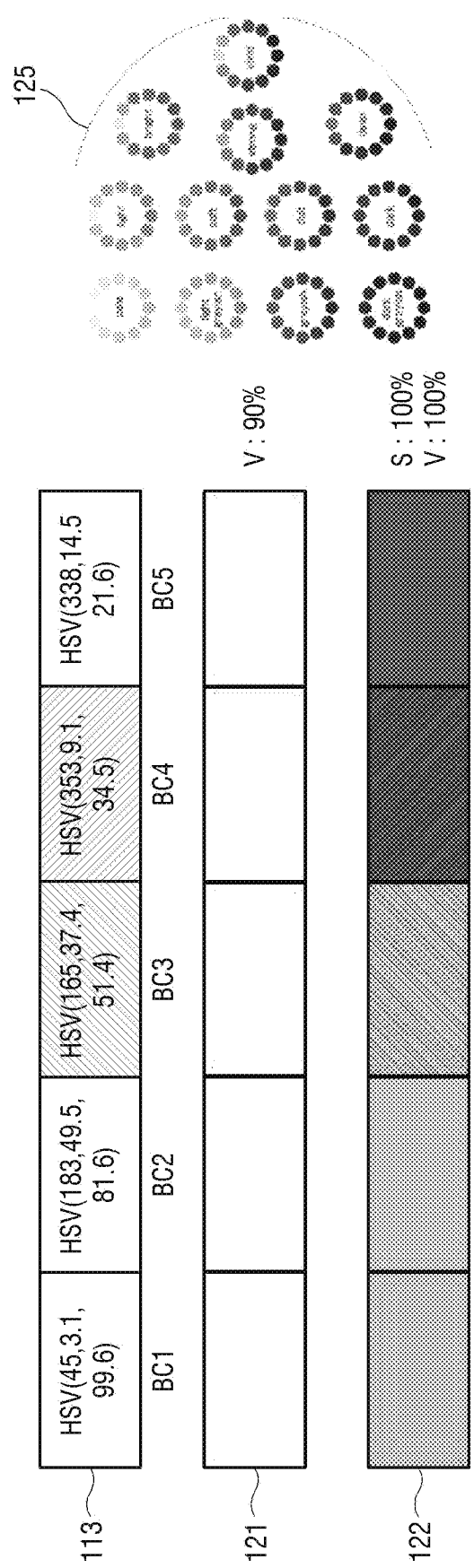
FIG. 12 is a diagram illustrating an example of converting a color palette based on a color tone according to an embodiment of the disclosure.

As an example, as illustrated in FIG. 12, when 'pastel tone' is set as a setting value of the color tone for the content video 45, the processor 15 may convert the color palette information 113 arranged in order of brightness into the color palette information 121 to which the pastel tone is reflected.

In addition, when 'vivid tone' is set as a setting value of the color tone for the content video 45, the processor 15 may convert the color palette information 113 arranged in order of brightness into the color palette information 122 to which the vivid tone is reflected.

In addition to this, the processor 15 may use color palette information 125 converted to correspond to various color tones set for the content video 45.

Next, in operation S103, the processor 15 applies the color palette information 113 to the content video 45 according to the color characteristics for each configuration preset in the content video 45. That is, the processor 15 may apply the color palette information 113 to the content video 45 on the basis of the color characteristics set for at least some area of the content video 45 or an object.

As an embodiment, the processor 15 may set a color tone for the content video 45 according to the user input and may change the color palette information based on the set color tone.

In addition, the processor 15 may set the information on the color characteristics for each area or each configuration for the content video 45 according to the user input and may change the color palette information based on the set information.

Accordingly, the color fitting the space well may be reflected to the content in consideration of the color tone and the characteristics for each area directly set by the user for the content.

Finally, in operation S104, the processor 15 displays the content video 45 whose color has been changed by performing the operations S101 to S103 on the screen.

Accordingly, the color fitting the space well may be reflected to the content in consideration of the color tone and the characteristics for each area set when the content is produced.

FIG. 13 is an example of illustrating a color change of content video depending on a space according to the embodiment of the disclosure. The illustrated example compares and shows the point where the color of the same content is displayed differently according to spaces by performing operations S32 to S34 of FIG. 3 for different spaces.

In one embodiment, in displaying the content video 130 in different spaces, the processor 15 may generate the color palette information by extracting the first color representing each space and at least one second color fitting the first color well from the captured videos 131, 132, and 133 photographed in each space, and reflect the color of the color palette information to each space to display content videos 1311, 1321, and 1331.

As described above, according to the disclosure, even if the content is the same, when the user's space is different, the content can be provided to the user in colors fitting each space.

Hereinabove, the disclosure has been described in detail through the preferred embodiments, but the disclosure is not limited thereto and may be implemented in various ways within the scope of the claims.

The invention claimed is:

1. A display apparatus, comprising:
   a signal receiver configured to receive a video signal of content;
   a communication interface to communicate with an external apparatus;
   a display; and
   a processor configured to:
      obtain an image by capturing a surrounding of the display apparatus, wherein the captured image is received from the external apparatus through the communication interface,
      identify a first color and a second color from the captured image, wherein the first color is a color of an object having the highest priority among a plurality of objects recognized in the captured image, and the second color is a complementary color of the first color, and
      display a content image of the content on the display, and change colors of the content image based on a plurality of colors including the first color and the second color.

2. The display apparatus of claim 1, wherein the processor is configured to allocate the first color and the second color to some areas of the content image based on information on a preset color tone and characteristics for each area of the content image.

3. The display apparatus of claim 2, further comprising:
   an input interface configured to receive a user input,
   wherein the processor is configured to set the information on the color tone and the characteristics for each area of the content image according to the received user input.

4. The display apparatus of claim 1, wherein the processor is configured to:
   convert RGB values of each of the first color and the second color into HSV values, and
   change colors of some areas of the content image using each of the converted HSV values.

5. The display apparatus of claim 4, wherein the processor is configured to:
   arrange each of the converted HSV values in order of high brightness, and
   change the colors of the some areas of the content image based on the arranged order.

6. A method of controlling a display apparatus, comprising:
   receiving a video signal of content;
   obtaining an image by capturing a surrounding of the display apparatus, wherein the captured image is received from an external apparatus through a communication interface;
   identifying a first color and a second color from the captured image, wherein the first color is a color of an object having the highest priority among a plurality of objects recognized in the captured image, and the second color is a complementary color of the first color; and
   displaying a content image of the content, and changing colors of the content image based on a plurality of colors including the first color and the second color.

7. The method of claim 6, further comprising:
   allocating the first color and the second color to some areas of the content image based on the information on a preset color tone and characteristics for each area of the content image.

8. The method of claim 6, further comprising:
   converting RGB values of each of the first color and the second color into HSV values; and
   changing colors of some areas of the content image using each of the converted HSV values.

* * * * *